RECTIFIER AND METHOD OF MAKING IT

Filed Dec. 29, 1945 3 Sheets-Sheet 1

INVENTORS: J. H. SCAFF
H. C. THEUERER
BY [signature]
ATTORNEY

July 8, 1952 J. H. SCAFF ET AL 2,602,211

RECTIFIER AND METHOD OF MAKING IT

Filed Dec. 29, 1945 3 Sheets-Sheet 2

INVENTORS: J. H. SCAFF
H. C. THEUERER

BY [signature]

ATTORNEY

July 8, 1952 J. H. SCAFF ET AL 2,602,211

RECTIFIER AND METHOD OF MAKING IT

Filed Dec. 29, 1945 3 Sheets-Sheet 3

LEGEND n-TYPE LOW BACK VOLTAGE n-TYPE HIGH BACK VOLTAGE p-TYPE

INVENTORS: J. H. SCAFF
H. C. THEUERER

BY [signature]

ATTORNEY

Patented July 8, 1952 2,602,211

UNITED STATES PATENT OFFICE 2,602,211

RECTIFIER AND METHOD OF MAKING IT

Jack H. Scaff, Summit, N. J., and Henry C. Theuerer, New York, N. Y., assignors to Bell Telephone Laboratories, Incorporated, New York, N. Y., a corporation of New York Application December 29, 1945, Serial No. 638,351

19 Claims. (Cl. 29—25.3)

This invention relates to devices that conduct electric current more readily in one direction than in the opposite direction and to methods and means of making such devices. It relates more particularly to such devices which include a body of germanium material.

Electronic asymmetric conductors of electricity may be divided into two general classes, i. e., those in which contact is made between bodies of different electrical conductivity (1) over a relatively wide area or (2) at a point or several discrete points. In either case there is a boundary condition between the bodies that inhibits current passing in one direction more than in the other. This invention is concerned with both types of conductors, but deals more in detail with the point contact type. In devices of the point contact type, a point, usually of a metallic conductor, is pressed against a surface of a body of semiconductive material. Such devices have been called crystal detectors, or crystal rectifiers and also point contact detectors, or point contact rectifiers.

It has been found that a rectifier having particularly desirable characteristics may be made by employing a metallic point contact to a germanium body. Germanium suitable for rectifiers may be of n-type or p-type. In a rectifier using n-type material, the greater flow of current occurs when the body or crystal is negative with respect to the point. Conversely, if the greater flow occurs when the crystal is positive the crystal material is said to be of p-type. The n-type material has a much higher rectifying capability than the p-type.

It is an object of this invention to improve the characteristics, particularly the electrical characteristics, of germanium type rectifiers.

A further object of this invention is the production of a germanium, point-contact rectifier capable of withstanding relatively high voltages in the reverse direction.

One feature of this invention resides in the use of germanium of high purity containing controlled, extremely small amounts of certain impurities such as arsenic, antimony, phosphorus, or bismuth. For example, in one illustrative embodiment of this invention, arsenic of the order of 0.00005 per cent but not more than 0.001 per cent may be utilized. In another illustrative embodiment, antimony of the order of 0.001 per cent but not more than 0.01 per cent may be employed. Comparable percentages of phosphorus or bismuth may be used.

Another feature of the invention involves heat treatment of germanium material under such controlled temperature, time, and environmental conditions, as to produce superior characteristics for its use in rectifier devices.

The foregoing feature includes heat treatment that converts n-type germanium to p-type or p-type to n-type, or more generally a series of heat treatments that will convert either type to the other and reconvert it if desired.

Inasmuch as the n-type germanium appears from many viewpoints to be more desirable than the p-type for rectification purposes, one feature of the invention involves a casting technique that produces an ingot containing both p and n-type material, plus a heat treatment which converts the p-type to n-type, thereby greatly increasing the yield of material suitable for certain types of rectifiers.

The foregoing and other objects and features of this invention will be understood more clearly and fully from the following detailed description of exemplary embodiments thereof with reference to the accompanying drawing in which.

Figure 8:
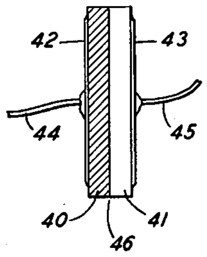
Figure 9:
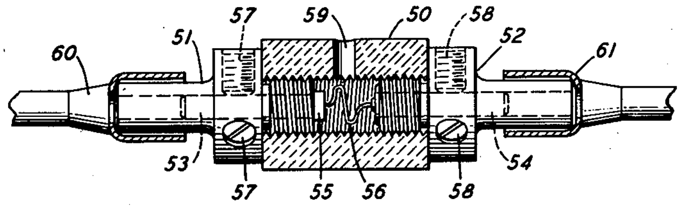
Figure 10:
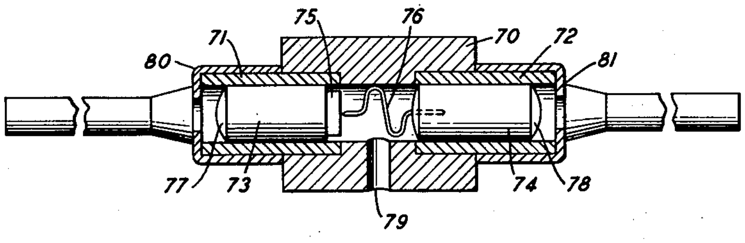

Figs. 3 to 7, inclusive, are conventionalized sections, in accordance with the accompanying legend, of ingots of germanium materials after different heat treatments;

Fig. 8 illustrates one form of an area contact, asymmetric conductor made of two types of germanium material, the types being indicated in accordance with the adjacent legend;

Fig. 9 illustrates one form of point-contact rectifier embodying this invention; and Fig. 10 illustrates another form of point-contact rectifier embodying this invention.

Figure 1:
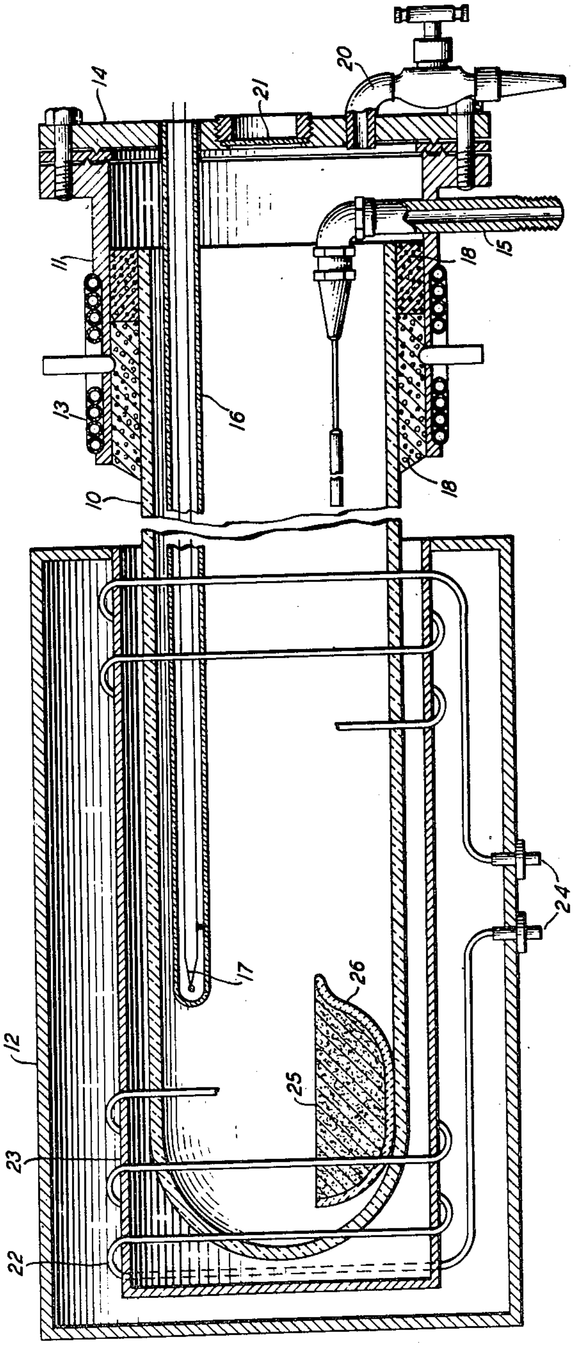
Fig. 1 is a sectional view of a furnace suitable for use in one stage of the process in accordance with one feature of the invention.

The crystals employed in the making of asymmetric conductors in accordance with this invention are cut from suitable portions of ingots of germanium material. The ingots may be prepared from germanium dioxide in a furnace such as the one illustrated in Fig. 1. The furnace which is used in a horizontal position comprises a tube 10 of silica or like material, provided with a water-cooled head 11 and a heater 12. The head 11 is provided with cooling coils 13, a cover 14 and a gas inlet 15 and is joined vacuum tight to the tube 10 by packing 18. A shield tube 16 of silica or other suitable material is secured to the head 14 and contains a thermocouple 17, The head 14 is provided also with a gas outlet 20 and a viewing window 21.

The heater 12 may comprise a coil of resistance wire 22 wound on a suitable form 23 and having terminals 24.

The material 25 to be processed, in this case germanium dioxide, is contained in a dish or boat 26, which may be of porcelain or other suitable material which will not react unfavorably with the material being processed.

An illustrative reduction of germanium oxide may be carried out as follows: About 75 grams of the oxide 25 are placed in a porcelain dish 26, which is put into the tube 10, which is then sealed by means of the cover 14. After the furnace tube is flushed with pure dry hydrogen, the oxide is heated to 650° C. and held at this temperature for three hours while a flow of hydrogen of about 10 litres per minute is maintained. During the next hour the temperature is raised to 1000° C. to complete the reduction with the germanium in the liquid state. The charge is then rapidly cooled to room temperature. Reduction by this process results in a 51-gram body of germanium, which may subsequently be broken into lumps or pieces of convenient size for the next step.

Figure 2:
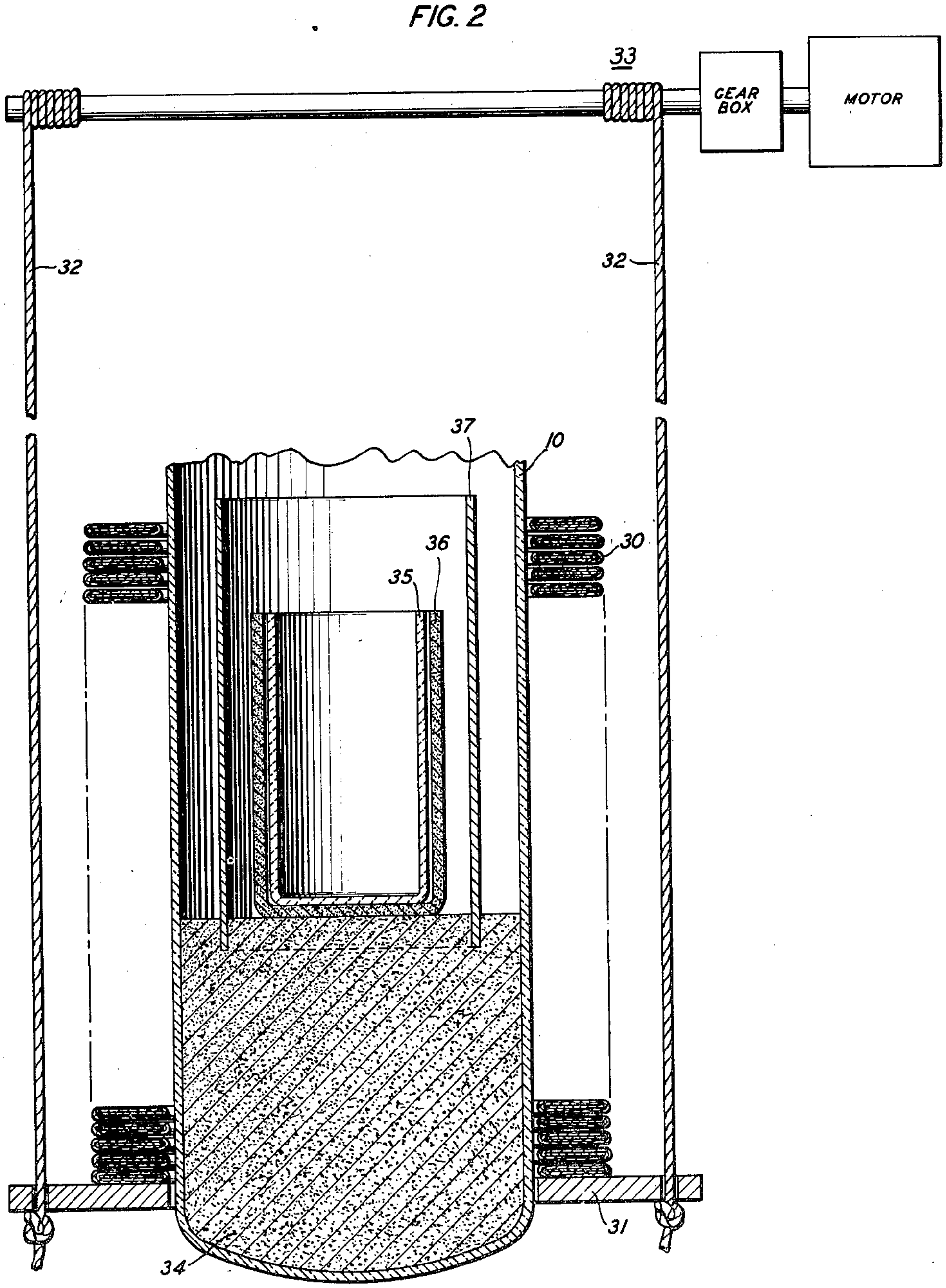
Fig. 2 is a sectional view of a portion of a furnace and of auxiliary means employed in another stage of the process.

The next treatment may be carried out in an induction furnace, portions of which are illustrated in Fig. 2. This furnace is similar to the one illustrated in Fig. 1 but is employed in the vertical position and is provided with a movable induction heater.

As shown in Fig. 2, the furnace tube 10, the lower portion only of which is shown, is surrounded by the coil 30 of an induction heater. The coil 30 is provided with suitable means for raising or lowering it with respect to the furnace charge. For example, this means may be a hoist comprising a platform 31, cable 32 and hoisting mechanism 33.

The crucible assembly, which is placed in the heating zone of the furnace tube on a bed of refractory material 34 such as aluminum oxide, may comprise a crucible 35, a graphite heater 36 and a cylinder 37 of silica or other like suitable material. The graphite heater is employed because germanium will not heat by direct induction. The cylinder 37 protects the furnace tube and reduces radiation losses.

The furnace charge may be either germanium material with the addition of about 0.1 per cent tin in a porcelain or like crucible or germanium material without the tin, in a graphite crucible. After locating the crucible assembly in the furnace, the furnace tube is closed and flushed with dry tank helium. With a helium flow of one litre per minute, the charge is first liquefied and then solidified from the bottom upwardly by raising the external induction coil at the rate of ⅛ inch per minute keeping the power input through the coil at a constant value. After the ingot has reached 650° C. the power is shut off and the ingot is allowed to cool to room temperature. Although the use of helium is preferred this step of the process may be carried out in a vacuum.

Under some conditions and for some purposes it may be desirable to perform both of the heatings in the same furnace. This could be done in a furnace such as is shown in Fig. 2. The reduction of the oxide to germanium would be done without moving the heater coil. Then the melt could either be allowed to cool and be reheated or cooled progressively by gradual removal of the heater.

Figure 3:
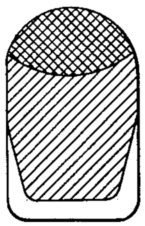
Figure 4:
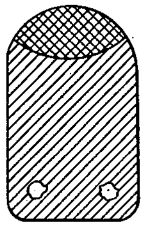

Ingots made in accordance with the foregoing procedure contain germanium material which may be characterized as of three different types separated into zones. The three different types of germanium material, which are really only two types, p-type and n-type, with the latter arbitrarily divided into a high-back-voltage and a low-back-voltage type, are characterized by certain electrical properties. These electrical properties may be determined by making an electric probe test on a suitably prepared surface of a longitudinal section of the ingot. An ingot made from germanium material to which 0.1 per cent tin has been added before or during melting has zones as illustrated in Fig. 3. As may be seen with reference to the accompanying legend, the bottom portion and part of the sides of the ingot which solidified first are of p-type material. The central section is of n-type material, which will stand a relatively high-back-voltage when used in a rectifier, and the top portion is also n-type material but of a lower back voltage. Ingots made from germanium material processed in a graphite crucible with no tin added to the melt, are found to have zones as illustrated in Fig. 4. In this material there is a smaller amount of p-type material, which is usually segregated into small islands near the bottom of the ingot. The low-back-voltage n-type material occupies a somewhat smaller zone at the top than is the case with germanium-tin material. The remainder of the ingot is high-back-voltage n-type material. In both ingots, the low-back-voltage n-type material has a reverse peak voltage of the order of about 10 to 50 volts. The high-back-voltage n-type material ranges from 50 to 60 volts back voltage adjacent the top to 100 to 150 volts back voltage adjacent the bottom in the germanium-tin ingots and to 100 to 475 volts back voltage adjacent the bottom in the germanium ingot treated in a graphite crucible. The p-type material, which does not appear to be as good a rectifying material for some purposes as the n-type, will withstand back voltages of the order of about 10 volts.

Although the illustrations of Figs. 3 to 6, inclusive, show sharp lines of demarcation between zones, this is strictly true only between the p and n-type materials. Here there is an abrupt change from p to n-type across what amounts to a barrier. The n-type material near the p-type will withstand relatively high-back-voltages such as the 475 volts previously noted. As the top of the ingot is approached the back voltage becomes lower. The line shown between the two zones of n-type was arbitrarily picked at about 50 volts back voltage. The ingot contains greater amounts of impurity as the top is approached, i. e., the direction of cooling, and in some cases there is sufficient impurity near the top to give the material a low-back-voltage characteristic.

Figure 5:
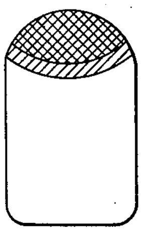
Figure 6:
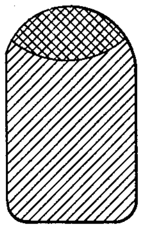

If an ingot such as those shown in Fig. 3 is heated to about 800° to 900° C. and cooled rapidly, e. g. air quenched in about fifteen minutes, most of the high-back-voltage n-type material, except for a small region adjacent the top of the ingot is changed to p-type material as illustrated in Fig. 5. By subsequently heating the rapidly cooled ingot at from 400 to 700° C. or by slowly cooling from about 800° C. the p-type germanium may be entirely transformed to the high-back-voltage n-type. Thus the germanium material may be converted into all n-type material of a high-back-voltage characteristic except for a small portion adjacent the top of the ingot as in Fig. 6.

Figure 7:
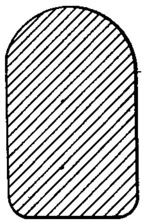

Germanium material containing only a very slight trace of a donor impurity such as arsenic, which is later discussed, and melted in a graphite crucible with no tin added, will have all of its n-type material of the high-back-voltage type. An ingot of such material when treated to convert whatever p-type material there is to n-type will be all of high-back-voltage n-type as illustrated in Fig. 7. If there is a higher amount of impurity there may be some low-back-voltage material near the top. Since specimens of both tin addition and graphite crucible types of germanium material when heated to 900° C. and rapidly cooled have substantially the same properties as those treated similarly at 800° C., the lower temperature may ordinarily be used for reasons of convenience.

In samples converted to p-type by rapid cooling from 800° C. and reheated at lower temperatures, it was found that below 400° C. no substantial changes in the characteristics of the p-type materials are obtained for periods of treatment up to about four hours; between 450° C. and 650° C. the p-type germanium is converted slowly to strongly rectifying n-type germanium of high-back-voltage characteristic; at 500° C. or 600° C. the p-type germanium is nearly all converted to n-type in about four hours, complete transformation occurring within about twenty hours. The rate of conversion from p-type to high-back-voltage n-type germanium is dependent upon the temperature and appears to be maximum at about 550° C. At 450° C. or 650° C. the conversion is incomplete even after twenty hours at these temperatures, whereas at 550° C. conversion is complete in about four hours. If an n-type material ingot is heat treated at about 700° C. the bottom portion only is converted to p-type leaving n-type material of high-back-voltage above the p-type material. As in the original ingot there is a sharp line of demarcation between the p and n-type. Thus, a piece of material could be cut from the high-back-voltage n-type zone and heat treated to make the portion which had been at the bottom with respect to the ingot of p-type leaving n-type at the top. This material could be used for making conductive devices such as shown in Fig. 8 and which are later more fully discussed.

The heat treatment for converting one type of germanium to the other is completely reversible so that conversion in either direction may be obtained at will by suitable treatment. For example, the high-back-voltage n-type material obtained by means of a previously described cycle of treatment may be reconverted to p-type by heating to 800° and rapidly cooling. Also, if high-back-voltage n-type germanium is desired, it may be obtained directly from the ingots, as illustrated in Figs. 3 and 4 by employing the low temperature heat treatment at about 550° C. or by slowly cooling from 800° C.

To determine whether heat treatment produced a phase transformation in the germanium material, the crystal structure of p and n-type specimens prepared by heat treatment of adjacent sections from an ingot were given an X-ray examination. The structures were, however, identical, the lines obtained being in agreement to those reported in the literature for the diamond cubic germanium lattice. Subsequently precision measurements were made of the lattice constant of these same samples; but again no differences were noted.

It is believed that this invention may be understood more fully if some of the possible reasons for the behavior of the germanium material under heat treatment are discussed. Semiconductors such as are employed in dry rectifiers and like devices have been classified as excess semiconductors or as deficit semiconductors. These two types have also been called electronic semiconductors and hole semiconductors. The theory is that certain impurities in a substance upset the electronic balance of the atomic structure by the addition or subtraction of electrons. The type of conductor where electrons are added is the so-called excess type, and the impurity which gives this type of conductor is known as a donor impurity. In other cases, the impurities abstract enough electrons from the principal substance to give the unbalanced or unstable condition which causes current to flow. This is the deficit type of semiconductor and the impurity which causes the deficit by abstracting electrons is known as an acceptor impurity.

Before further discussion of the effect of the donor and acceptor impurities, it may be well to note that the germanium materials under consideration in many respects behave similarly to precipitation hardening alloys. Such alloys contain a constituent whose solid solubility increases with increasing temperature. If such an alloy of a given composition is then heated above the solubility temperature, the solid solution may be retained in a metastable state at room temperature by cooling rapidly. On reheating to a temperature below the solubility temperature, the unstable solution decomposes, precipitating a new phase from solution with resultant changes of physical and electrical properties. In the present instance the formation of p-type germanium by rapid cooling may result from the retention of an impurity in solution while formation of n-type germanium may result from precipitation of this impurity from solution.

The known donor impurities for germanium are arsenic, antimony, phosphorus, and bismuth, or in other words, the members of the odd series of the fifth periodic group according to Mendeleeff. It has been found that material considered to be essentially pure germanium contains very small amounts of arsenic and phosphorus. Such material has been successfully used for making germanium crystals for rectifiers of n-type rectification. However, when these impurities were removed no n-type rectification was obtained regardless of the treatment of the material.

Furthermore, it has been found that if proper impurities are added to this material from which impurities have been removed, n-type rectification can be again obtained. For example, small amounts of arsenic, antimony, and bismuth have been added to such materials with satisfactory results. In view of the foregoing it seems reasonable to believe that the donor impurities previously noted are responsible for n-type rectification of germanium. It seems probable that an acceptor impurity exists which tends to produce p-type rectification. In the region of the ingot which is n-type, the donors are in excess and in the region of the ingot which is p-type, acceptors are in excess.

To explain the inversion in the rectification of germanium which occurs on heat treatment, it is necessary to assume that either the donors or the acceptors can be thermally activated. Assuming that the acceptors are activated by heat treatment at 800° C. and are retained in this state by rapid cooling to room temperature, then those portions of the ingot which have a higher concentration of active acceptors than of donors, will have p-type rectification.

Because of differences in the rate of segregation of two impurities on solidifying an ingot from the bottom upward, the relative concentration of the impurities may vary at progressive locations in the ingot. For example, the donor may have a lower concentration at the bottom of the ingot than the acceptor, and still be in excess of the acceptor higher in the ingot. Under these conditions an ingot, heat treated as above, may have p-type rectification near the bottom where the acceptor is in excess, and n-type rectification at locations higher in the ingot where the donor is in excess. The line of demarcation between p and n-types is sharply defined. This affords an explanation for the shell of p-type germanium found in certain initial ingots before further heat treatment. Evidently the cooling conditions, which occur in the normal cooling cycle, are such that an excess of active acceptor is present in the first material to freeze and the material is p-type. Due to differences in segregation rates, as freezing progresses, the donor concentration rapidly overtakes the active acceptor concentration and an inversion to n-type germanium occurs. If after the 800° C. heat treatment, the ingot is subsequently heated at about 500° C. the acceptors are deactivated and in consequence the donor impurities are in virtual excess throughout the ingot and only n-type rectification is observed.

An alternative explanation of the heat treating phenomena involves the assumption that the donors are deactivated by appropriate thermal treatment. The reasoning is analogous in the former case except that now the 800° C. treatment deactivates the donors and rapid cooling retains their inactive form, while subsequent heating at about 500° C. results in conversion to the active form. To explain complete conversion to n-type germanium by the 500° treatment, it is now necessary to postulate that the active donor concentration is everywhere in excess of the acceptors. Since in some cases the 800° C. treatment results in only a partial conversion to p-type germanium, it is necessary to suppose that at high concentrations the donors are incompletely deactivated.

Although both of these explanations are in agreement with the experimental evidence, the concept of thermally deactivated acceptors is preferred, because it is compatible with the solid solubility concept previously referred to. In general, it has been observed that impurities which form solid solutions with semiconductors, reduce their resistivity and tend to produce strongly rectifying materials. Since p-type rectification is observed in ingots rapidly cooled from 800°, it seems reasonable that the acceptors, which are held in solid solution by this process are activated. The conversion to n-type germanium by heating at 500° C. may then be due to the deactivation of the acceptors by precipitation from this unstable solid solution.

Although no acceptor impurity has been definitely identified, it is reasonable to suspect that this impurity, or one of them may be oxygen. Thermal transformations are known to occur in germanium oxide near 500° C. Moreover, ingots made in graphite crucibles have much less tendency to form p-type germanium, and this may be due to an initially lower oxygen content in consequence of the reducing nature of the graphite. Furthermore, since the tin in the germanium-tin composition has been found to perform no function in the finished material from the electrical viewpoint, most of the tin being segregated in the generally unusable top portion of the ingot, it seems reasonable to believe that tin may also act as a deoxidizer although not to the same extent as the graphite.

Since the presence of p-type germanium is thought to be due to an acceptor impurity, such as oxygen, it follows that if this impurity could be completely eliminated from the ingot, only n-type germanium would be found, irrespective of the thermal history of the ingot. On the other hand, the concentration of the donor impurities might be increased sufficiently without changing the acceptor concentration so that an ingot having only n-type rectification could be produced. This has been found to be actually the case; but because of the higher total impurity content of such ingots, the peak back voltages are reduced to undesirably low values. For example, note the low-back-voltage n-type material at the top of the ingots illustrated in Figs. 3 and 4, which material is not changed to p-type (Fig. 5) nor to high-back-voltage n-type (Fig. 6) by subsequent heat treatments. This may be due to additional donor impurities carried by the tin which was added or to intentionally added impurity.

After processing, the ingot of germanium material may be cut into small bodies or crystals for use in rectifiers. Although the preferred material is the n-type high-back-voltage material, since it may be used to make a rectifier of high rectification ratio, the other material will also make a rectifier device. Also, if an ingot such as is shown in Fig. 3 be cut so that a slab or body contains both n and p-type material an area-contact or volume type rectifier such as disclosed in Fig. 8 may be made. In this figure, the slab is made up of a portion 40 of high-back-voltage n-type material, and a portion 41 of p-type material separated by a barrier 46, electrodes 42 and 43 are secured respectively to the two sides of the device, and leads 44 and 45 secured, as by soldering for example, to the respective electrodes. Besides being a rectifier the device illustrated in Fig. 8 also exhibits photoelectric properties when irradiated at the boundary 46 between the two types of germanium at 40 and 41. As previously noted, an n-type slab may be suitably treated to obtain a conductor like this.

One form, which the point-contact type of rectifier may take, is illustrated in Fig. 9 in which a main housing 50 of a ceramic or like insulating material is provided with metallic end pieces or members 51 and 52, which screw into the opposite ends of the housing 50. The rectifier elements are carried on the respective ends of pins 53 and 54, fitted into bores in the end pieces 51 and 52. A crystal element 55, which may be metal-coated on one side, for example with copper, is secured to the end of the pin 53, which may be of brass, and an S-shaped contact spring 56 is secured to the end of the pin 54, which may also be of brass. The spring contact 56 may be of tungsten suitably pointed at the end which makes contact with the crystal 55. The parts are adjusted by suitable positioning of the pins 53 and 54 and are then held in place by means of the set screws 57 and 58. The adjustments are carried on along with electrical stabilizing until the device exhibits the characteristics desired for a particular purpose. After the adjustments are completed, the units are vacuum impregnated with a suitable mixture such as a wax through the orifice 59 in the body 50. Connection may be made to the reduced portion of the end pieces 51 and 52 by means of friction type connectors 60 and 61.

A sealed unit similar in some ways to Fig. 9 is shown in Fig. 10. A body 70 of phenolic condensation product or like material has sleeves or cylinders 71 and 72 molded in opposite ends thereof. Studs 73 and 74 of brass or like material, which are a press fit in the sleeves 71 and 72, carry respectively the crystal 75 and the spring contact element 76. The studs 73 and 74 are forced into the sleeves 71 and 72, respectively, in positions for suitable operation of the device, as determined by appropriate electrical measurements. The studs are then secured in their respective sleeves by means of solder as shown at 77 and 78, respectively. The device may be vacuum impregnated with a suitable wax or wax-like mixture through the orifice 79. Connectors 80 and 81 making a frictional fit with or otherwise secured to the sleeves 71 and 72, respectively, may be used for making electrical connection to the rectifier device.

In a device such as is shown in Fig. 9 low capacity across the unit is obtained by means of low dielectric constant insulating material and small diameter of the parts.

Crystal elements, such as 55 and 75 of the devices shown in Figs. 9 and 10, respectively, may be prepared for use before assembly by lapping the surface to which contact is to be made on a suitable smooth surface with a fine abrasive. The surface may then be etched. A suitable etchant may comprise 10 cubic centimeters of nitric acid, 5 cubic centimeters hydrofluoric acid and 200 milligrams of copper nitrate in 10 cubic centimeters of water. An etching in such a solution for about thirty seconds gives a suitable surface.

The active surface of the crystal element may also be subjected to an electrolytic etching, which improves the device for some purposes by considerably reducing the back current. This etching may be done after the nitric-hydrofluoric etching previously noted, or may be done directly on a lapped crystal without the intermediate etching. The crystal may be etched at a positive potential of from 4 to 6 volts direct current for from 30 to 120 seconds in 24 per cent hydrofluoric acid.

Although specific embodiments of the invention have been shown and described, it will be understood that they are but illustrative and that various modifications may be made therein without departing from the scope and spirit of this invention as defined in the appended claims.

Reference is made to applications Serial No. 28,706 filed May 22, 1948, and Serial No. 28,707 filed May 22, 1948, respectively each a division of this application wherein certain features of the devices and methods described hereinabove are claimed.

What is claimed is:

1. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere, said melt also containing a small amount of tin, cooling the melt to form an ingot having zones of material of different electrical polarity, cutting a body from either zone of the ingot, and making electrical connections to spaced portions of said body.

2. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere, said melt being in a graphite crucible, cooling the melt to form an ingot having zones of material of different electrical polarity, cutting a body from either zone of the ingot, and making electrical connections to spaced portions of said body.

3. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere and in the presence of a deoxidizing agent, cooling the melt to form an ingot having zones of material of different electrical polarity, heat treating the ingot in an oxygen-free atmosphere to reverse the polarity of a large portion of the material in one of said zones to produce a larger portion of material of one polarity, cutting a body from this portion, and making electrical connection to spaced portions of said body.

4. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere and in the presence of a deoxidizing agent, cooling the melt to form an ingot having zones of low-back-voltage n-type material, of high-back-voltage n-type material, and of p-type material, heat treating the ingot in an oxygen-free atmosphere to convert most of the high-back-voltage n-type material to p-type material, cutting a body from the p-type material, and making electrical connections to spaced portions of said body.

5. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere and in the presence of a deoxidizing agent, cooling the melt to form an ingot having zones of low-back-voltage n-type material, of high-back-voltage n-type material, and of p-type material, heat treating the ingot in an oxygen-free atmosphere by heating it to 800°–900° C. and cooling rapidly to convert the most of the high-back-voltage n-type material to p-type material, cutting a body from the p-type material, and making electrical connections to spaced portions of said body.

6. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere and in the presence of a deoxidizing agent, cooling the melt to form an ingot having zones of low-back-voltage n-type material, of high-back-voltage n-type material, and of p-type material, heat treating the ingot in an oxygen-free atmosphere to convert the p-type material to n-type material, cutting a body from the ingot, and making electrical connections to spaced portions of said body.

7. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere and in the presence of a deoxidizing agent, cooling the melt to form an ingot having zones of low-back-voltage n-type material, of high-back-voltage n-type material, and of p-type material, heat treating the ingot in an oxygen-free atmosphere by heating it to 800°–900° C. and cooling slowly to convert the p-type material to n-type material, cutting a body from the ingot, and making electrical connections to spaced portions of said body.

8. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere and in the presence of a deoxidizing agent, cooling the melt to form an ingot having zones of low-back-voltage n-type material, of high-back-voltage n-type material, and of p-type material, heat treating the ingot in an oxygen-free atmosphere by heating it to 800°–900° C. and cooling slowly to convert the p-type material to high-back-voltage n-type material, cutting a body from the high-back-voltage n-type material, and making electrical connections to spaced portions of said body.

9. The method of making an asymmetrical electrical conductor that comprises preparing a melt of germanium including a trace of an impurity consisting of at least one of the elements of the odd series of the fifth periodic group according to Mendeleeff, in a substantially oxygen-free atmosphere and in the presence of a deoxidizing agent, cooling the melt to form an ingot having zones of low-back-voltage n-type material, of high-back-voltage n-type material, and of p-type material, heat treating the ingot in an oxygen-free atmosphere by heating it to 400°–700° C. for from four to twenty hours to convert the p-type material to n-type material, cutting a body from the ingot and making electrical connections to spaced portions of said body.

10. The method of preparing germanium material for use in electrically conductive devices that comprises preparing in a crucible by the application of heat, a melt of germanium containing a trace of at least one of the elements arsenic, antimony, bismuth and phosphorus, in an atmosphere of helium, and in the presence of a deoxidizing agent, and progressively cooling the melt from the bottom toward the top by gradual withdrawal of the heating source, thereby producing an ingot having a zone of p-type material adjacent its bottom, a zone of low-back-voltage n-type material adjacent its top and an intervening zone of high-back-voltage n-type material.

11. The method of preparing germanium material for use in electrically conductive devices that comprises preparing in a crucible by application of heat a melt of germanium containing about .00005 per cent but not more than .001 per cent of arsenic in an atmosphere of helium, and in the presence of a deoxidizing agent, and progressively cooling the melt from the bottom toward the top by gradual withdrawal of the heating source, thereby producing an ingot having a zone of p-type material adjacent its bottom, a zone of low-back-voltage n-type material adjacent its top and an intervening zone of high-back-voltage n-type material.

12. The method of preparing germanium material for use in electrically conductive devices that comprises preparing a crucible by application of heat, a melt of germanium containing about .001 per cent, but not more than .01 per cent of antimony in an atmosphere of helium and in the presence of a deoxidizing agent, and progressively cooling the melt from the bottom toward the top by gradual withdrawal of the heating source thereby producing an ingot having a zone of p-type material adjacent its bottom, a zone of low-back-voltage n-type material adjacent its top and an intervening zone of high-back-voltage n-type material.

13. The method of making an element of a conductive device, which element contains p-type and n-type germanium material separated by a distinct barrier, that comprises cutting a body from the high-back-voltage n-type zone of a suitable ingot of germanium material and heat treating at a temperature between 400°–800° C. to convert a part only of the n-type material to p-type material.

14. In the method of making germanium material suitable for electrically conductive devices wherein the germanium material is electrically positive or negative depending on its previous heat treatment, the step of converting from negative to positive that comprises heat treating the material at 800°–900° C. and then rapidly cooling it.

15. In the method of making germanium material suitable for electrically conductive devices wherein the germanium material is electrically positive or negative depending on its previous heat treatment, the step of converting from positive to negative that comprises heat treating the material at 400°–700° C. for an extended time.

16. The method of preparing n-type germanium material for use in electrically conductive devices that comprises preparing in a graphite crucible by the application of heat a melt consisting essentially of germanium and a trace of at least one of the elements arsenic, antimony, bismuth and phosphorus, in a substantially non-oxidizing atmosphere, and gradually cooling the melt to form an ingot.

17. The method of preparing germanium material for use in electrical translating devices that comprises preparing a melt consistently essentially of germanium and a trace of at least one of the elements arsenic, antimony, bismuth and phosphorus by the application of heat and progressively cooling the melt from one end to the other.

18. The method of preparing germanium material for translating devices that comprises placing a charge consisting essentially of germanium containing a trace of a conductivity type determining impurity in a crucible, inductively heating said crucible to melt said charge, and progressively cooling the melted charge from one extremity to the other to form an ingot.

19. In the method of making germanium material for translating devices, the step which comprises heating germanium material containing a trace of a conductivity type determining impurity and being of one conductivity type, in an atmosphere of helium and at a temperature in the range between 400 degrees C. and 700 degrees C. to convert the material to the opposite conductivity type.

JACK H. SCAFF.
HENRY C. THEUERER.

REFERENCES CITED

The following references are of record in the file of this patent:

UNITED STATES PATENTS

| Number | Name | Date |
|---|---|---|
| 912,726 | Packard | Feb. 16, 1909 |
| 1,128,552 | Turner | Feb. 16, 1915 |
| 1,211,754 | Rawls | Jan. 9, 1917 |
| 1,665,936 | Slepian | Apr. 10, 1928 |
| 1,708,571 | Hartmann | Apr. 9, 1929 |
| 1,870,577 | Lamb | Aug. 9, 1932 |
| 1,908,188 | Ruben | May 9, 1933 |
| 2,198,843 | Ruben | Apr. 30, 1940 |

| Number | Name | Date |
|---|---|---|
| 2,209,712 | Brennan | July 30, 1940 |
| 2,395,259 | Ellis et al. | Feb. 19, 1946 |
| 2,402,839 | Ohl | June 25, 1946 |

OTHER REFERENCES

Physical Review, May, 1922, pages 447, 451, and 452. (On File in Div. 3 of the Patent Office, 75-Germanium Digest.)

Preparation of High Voltage Germanium Crystals; N. D. R. C. 14—341, Purdue University, November 1, 1944. Declassified December 14, 1945. Identified as P. B. 5200 at the Library of Congress.

Preparation and Heat Treatment of Germanium Alloys; N. D. R. C. 14—576, Purdue University, October 31, 1945. Declassified July 6, 1946. Identified as P. B. 25,734 at the Library of Congress.

Zeitschrift für Anorganische und Allgemeine Chemie, vol. 244 (1940), pages 205–223.